United States Patent
Lange et al.

(10) Patent No.: US 7,363,132 B2
(45) Date of Patent: *Apr. 22, 2008

(54) METHOD AND SYSTEM FOR CONTROLLING STEERING DEADBAND IN A MOBILE MACHINE

(75) Inventors: Arthur F. Lange, Sunnyvale, CA (US); Keith Kennedy, Loveland, CO (US); Mark Gibson, Portland, OR (US)

(73) Assignee: Trimble Navigation Limited, Sunnyvale, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 11/152,629

(22) Filed: Jun. 14, 2005

(65) Prior Publication Data

US 2006/0015229 A1    Jan. 19, 2006

Related U.S. Application Data

(63) Continuation-in-part of application No. 10/892,002, filed on Jul. 14, 2004, now Pat. No. 7,188,015.

(51) Int. Cl.
*B62D 5/04* (2006.01)
*G06F 19/00* (2006.01)

(52) U.S. Cl. ........................................ 701/41; 280/443

(58) Field of Classification Search ............... None
See application file for complete search history.

(56) References Cited

U.S. PATENT DOCUMENTS

| | | | | |
|---|---|---|---|---|
| 3,813,932 | A * | 6/1974 | Wallace | 73/118.1 |
| 3,889,527 | A * | 6/1975 | Wallace | 73/118.1 |
| 5,767,767 | A * | 6/1998 | Lima et al. | 340/438 |
| 6,595,045 | B1 * | 7/2003 | Fuglewicz et al. | 73/129 |
| 7,139,621 | B2 * | 11/2006 | Gharsalli | 700/72 |
| 7,225,060 | B2 * | 5/2007 | O'Connor et al. | 701/1 |
| 2006/0015228 | A1 * | 1/2006 | Lange | 701/41 |

OTHER PUBLICATIONS

Harries, G.O., et al., "Automatic Ploughing: A Tractor Guidance System Using Opto-Electronic Remote Sensing Techniques and a Microprocessor Based Controller", (1981),21.

* cited by examiner

*Primary Examiner*—Michael J. Zanelli

(57) ABSTRACT

Embodiments of the present invention recite a method and system for controlling steering dead band in a mobile machine. In one embodiment, a first dead band value for actuating a steering mechanism in a first direction is determined. Then, a second dead band value for actuating the steering mechanism in a second direction is determined. The first dead band value and the second dead band value are then stored as discrete values.

36 Claims, 15 Drawing Sheets

METHOD AND SYSTEM FOR CONTROLLING STEERING DEADBAND IN A MOBILE MACHINE

RELATED U.S. APPLICATION

This application is a Continuation-in-Part of U.S. patent application Ser. No. 10/892,002 by Arthur Lange, et al., entitled A Method and System for Controlling a Mobile Machine, filed on Jul. 14, 2004, now U.S. Pat. No. 7,188,015 and assigned to the Assignee of the present invention. To the extent it is not repeated, this related application is incorporated herein by reference.

TECHNICAL FIELD

The present invention relates generally to controlling a mobile machine. More specifically, embodiments of the present invention relate to controlling steering dead band in a mobile machine.

BACKGROUND

Modern utility vehicles perform various functions in fields including agriculture, construction, road and lot maintenance, mining, surveying, and others. In many activities related to such fields, some vehicle operations tend to be repetitive. While this discussion pertains to all such fields and vehicles used therein, for clarity and brevity, the discussion herein will focus on agricultural vehicles for illustration and explanation.

Operating agricultural vehicles such as tractors, harvesters and the like can involve such repetitiveness. For instance, when plowing or planting a field, an operator must make repeated passes across a field, which may be of significant area (e.g., acreage, etc.). Due to the repetitive nature of the work and irregularities in the terrain, gaps and overlaps in the rows of crops can occur. This can result in damaged crops, overplanting, or reduced yield per acre. As the size of agricultural vehicles and farming implements continues to increase, precisely controlling their motion becomes more important.

Guidance systems are increasingly used for controlling agricultural and environmental management equipment and operations such as road side spraying, road salting, and snow plowing where following a previously defined route is desirable. This allows more precise control of the vehicles than is typically realized than if the vehicle is steered by a human. Many rely upon furrow followers which mechanically detect whether the vehicle is moving parallel to a previously plowed plant furrow. However, these guidance systems are most effective in flat terrain and when detecting furrows plowed in a straight line. Additionally, many of these systems require factory installation and are too expensive or inconvenient to facilitate after market installation.

Further, almost all utility vehicles and machines used in agricultural and similar activities are characterized by some amount of discrepancy in the positioning of its steering control (e.g., a steering wheel), with respect to the actual direction the wheels of the vehicle are oriented towards therewith. This discrepancy is commonly referred to as "play" in the steering mechanism, which can be characterized by a dead band in coupling the steering wheel to the vehicle's wheels. The term "dead band" or steering play refers to the fact that there is no change in the position of the guidance wheel touching the ground as the steering wheel is moved. The range of this dead band can vary from vehicle to vehicle, e.g., from tractor to tractor. Such steering play can adversely affect the performance of guidance systems. This is especially noticeable when reversing the direction in which the steering wheel is turned (e.g., if the steering wheel has been turned to the right and then reversed to turn the vehicle to the left). Additionally, some vehicles may exhibit more steering play when the steering wheel is turned in one direction than they exhibit when the steering wheel is turned in the other direction. As a result, a steering bias may be introduced in vehicle guidance systems because the steering play is not fully compensated for in one direction and over-compensated for in the other.

Steering play is frequently related to a sum of various mechanical alignments, adjustments, slow and cumulative mechanical changes, such as are associated with loosening, wear and tear on linkages, hydraulic actuators, valves, leakage and pressure changes, etc. Steering play is thus typically more pronounced in older vehicles than in newer ones. Further, older vehicles typically wear, loosen and otherwise change position at faster rates than newer ones. Thus, steering play in older vehicles may increase after relatively shorter operational periods and/or lighter operational duty.

Such play can cause variation and/or errors in positioning the vehicle for one or more of many repetitive operations. Such variation requires correction, which can occupy an operator's attention and efforts, such as for manual compensation, adjustment of a guidance system, etc. Occupying the operator's attention can distract the operator, which can have concomitant negative safety and economic effects. Occupying the operator's efforts makes operating the vehicle more strenuous or troublesome than it would otherwise be.

Further, such errors can cause consequences such as that some portions of land to be subject to the vehicle's activity are actually missed, and others are unnecessarily exposed to repetition thereof. Both such consequences can have negative economic and other effects. For instance, where a portion of crops is missed by plow, seed, fertilizer, pesticide, etc., that portion may be unproductive, or the vehicle's activities may need to be repeated (or substituted with other activity, e.g., corrective manual activity or activity of another vehicle) to cover the missed portion. Unnecessary exposure of another region, e.g., proximate to the missed portion, can occur with such repetition, which can be wasteful and/or harmful. Some economic cost typically inheres with the repetition itself. And for instance, where excess seed, fertilizer, pesticide, etc. is inadvertently (e.g., inaccurately, mistakenly, etc.) applied to a previously covered region proximate to the missed portion, crops can be less productive or barren in that proximate region.

SUMMARY

Accordingly, a need exists for a method and system for guiding mobile machines such as agricultural and other vehicles, which mitigate undesirable guidance-related and other effects associated with steering play. It is also desirable that such a method and system mitigate such undesirable steering play-related effects automatically. Further, it is desirable that such a system be implemented in a configuration that can compliment automatic steering control navigational guidance and that is suitable for after market installation in those vehicles.

Embodiments of the present invention recite a method and system for controlling steering dead band in a mobile machine. In one embodiment, a first dead band value for actuating a steering mechanism in a first direction is determined. Then, a second dead band value for actuating the steering mechanism in a second direction is determined. The first dead band value and the second dead band value are then stored as discrete values.

The steering mechanism is thus controlled according to the dead band values to compensate for the dead band. The method and system automatically mitigates undesirable guidance-related and other effects associated with the dead band, which characterizes the steering play. This system is implemented, in one embodiment, to compliment automatic steering control navigational guidance and is suitable for after market installation in vehicles.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION

Figure 1A:
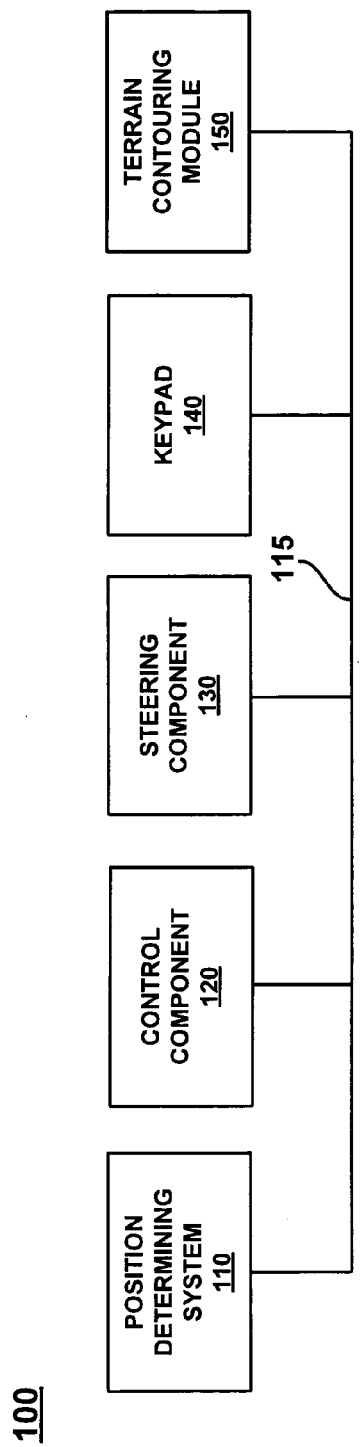
FIGS. 1A and 1B show an exemplary system for controlling a mobile machine in accordance with embodiments of the present invention.

Embodiments of the present invention are directed to a method and system for controlling steering dead band in a mobile machine. Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims and their equivalents.

Furthermore, in the following detailed description of embodiments of the present invention, numerous specific details are set forth in order to provide a thorough understanding of the present invention. However, embodiments of the present invention may be practiced without these specific details. In other instances, well-known methods, systems, procedures, components, circuits, devices and apparatus, etc., have not been described in detail so as not to unnecessarily obscure aspects of the present invention.

Portions of the detailed description that follows are presented and discussed in terms of processes. Although steps and sequencing thereof are disclosed in figures herein (e.g., FIGS. 6, 9A, 9B, and 9C) describing the operations of these processes (e.g., processes 600 and 900, respectively), such steps and sequencing are exemplary. Embodiments of the present invention are well suited to performing various other steps or variations of the steps recited in the flowcharts of the figures herein, and in a sequence other than that depicted and described herein.

Embodiments of the present invention provide a method and system for controlling steering dead band in a mobile machine. In one embodiment, the method includes measuring the dead band in both the left-to-right and right-to-left directions, storing a discrete value corresponding to a respective direction, and applying the dead band value to a controller of a steering mechanism. The steering mechanism is thus controlled according to the dead band value to compensate for the dead band.

Therefore, undesirable guidance-related and other effects associated with dead band, which characterizes steering play, are mitigated. Advantageously, the system is implemented, in one embodiment, to compliment automatic steering control navigational guidance and is suitable for after market installation in vehicles, which can prolong the useful operational life of vehicles and mobile machines, especially those whose duty nature and cycles cause steering mechanism wear.

Section I

Exemplary Mobile Machine Control Platform and Process

Embodiments of the present invention relate to a method and system for controlling steering dead band in a mobile machine. The description of the method and system for controlling steering dead band in a mobile machine commences at Section II at FIG. 7. Presented first, Section I, FIGS. 1-6 represent a discussion of an exemplary method and system for controlling a mobile machine, to provide context to the discussion of the method and system for controlling steering dead band in a mobile machine, of Section II.

FIG. 1A is a block diagram of an exemplary system 100 for controlling a mobile machine 105 in accordance with embodiments of the present invention. It is appreciated that the components described below with reference to FIG. 1A may be implemented as separate components, or may be integrated as various combinations of discreet components, or as a single device. In FIG. 1A, a position determining system is coupled with a control component 120 and a steering component 130 via a communication network or coupling 115. Additionally, system 100 may comprise an optional keypad 140, a terrain compensation module component (e.g., TCM 150), and/or a dead band steering control system which are also coupled with coupling 115.

In embodiments of the present invention, coupling 115 is a serial communications bus. In one embodiment, coupling 115 is compliant with, but not limited to, the controller area network (CAN) protocol. CAN is a serial bus system which was developed for automotive use in the early 1980s. The Society of Automotive Engineers (SAE) has developed a standard CAN protocol, SAE J1939, based upon CAN specification 2.0. The SAE J1939 specification provides plug-and-play capabilities and allows components from various suppliers to be easily integrated in an open architecture.

Position determining system 110 determines the geographic position of mobile machine 105. For the purposes of the present invention, the term "geographic position" means the determining in at least two dimensions (e.g., latitude and longitude), the location of mobile machine 105. In one embodiment of the present invention, position determining system 110 is a satellite based position determining system and receives navigation data from satellites via antenna 107 of FIG. 1B. Examples of satellite based position determining systems include the global positioning system (GPS) navigation system, a differential GPS system, a real-time kinematics (RTK) system, a networked RTK system, etc. While the present embodiment recites these position determining systems specifically, it is appreciated that embodiments of the present invention are well suited for using other position determining systems as well such as ground-based position determining systems, or other satellite-based position determining systems such as the GLONASS system, or the Galileo system currently under development.

Figure 1B:
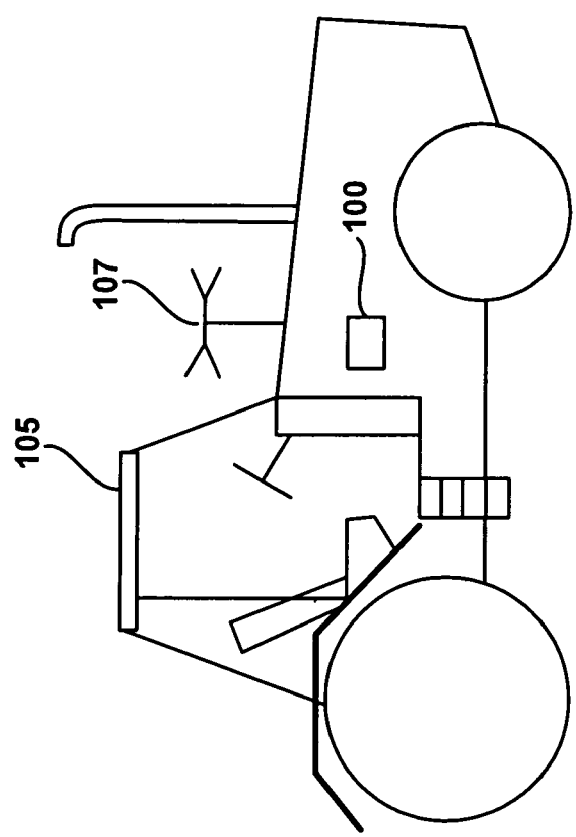

In embodiments of the present invention, control component 120 receives position data from position determining system 110 and generates commands for controlling mobile machine 105 of FIG. 1B. In embodiments of the present invention, mobile machine 105 is an agricultural vehicle such as a tractor, a harvester, etc. However, embodiments of the present invention are well suited for controlling other vehicles such as snow plows, road salting, or roadside spraying equipment as well. In one embodiment, is response to position data received from position determining system 110, control component 120 generates a message (e.g., a steering command) to steering component 130 which then controls the steering mechanism of mobile machine 105. In embodiments of the present invention, control component 120 is operable for generating steering commands to an electrical steering component and a hydraulic steering component depending upon the configuration of system 100.

In embodiments of the present invention, keypad 130 provides additional input/output capabilities to system 100. In embodiments of the present invention, keypad 130 may also comprise a device drive 131 which allows reading a media storage device such as a compact disk (CD), a digital versatile disk (DVD), a memory stick, or the like. This allows, for example, integrating data from various software applications such as mapping software in order to facilitate controlling the movement of mobile machine 105. For example, field boundaries can be easily input into system 100 to facilitate controlling the movement of mobile machine 105.

TCM 150 provides the ability to compensate for terrain variations which can reduce the precision of position determining system 110 in determining the geographic position of mobile machine 105. For example, when traversing a hillside, the antenna 107 of the position determining system 110 can be displaced to one side or the other with respect to the center line of mobile machine 105, thus causing errors in determining the geographic position of mobile machine 105. As a result, gaps or overlaps can occur when plowing across contoured terrain is being performed. TCM 150 can detect the magnitude of displacement of antenna 107 with respect to the center line of mobile machine 105 (e.g., due to roll, pitch, and yaw) and send signals which allow control component 120 to generate steering commands which compensate for the errors in determining the geographic position of mobile machine 105.

In embodiments of the present invention, dead band steering control system 160 is for determining, storing, and generating values which are used to compensate for steering play which may be exhibited by mobile machine 105. For example, in many vehicles, the steering wheel can be turned to some extent before the guidance wheels of the vehicle begin to turn, or change position. When exhibited by vehicles utilizing 100 this dead band results in a loss of precision in guiding the vehicle along a chosen vector. As described above, this can result in gaps and/or overlaps of coverage when mobile machine 105 makes repeated passes.

In embodiments of the present invention, dead band steering control system determines a plurality of dead band values (e.g., the amount of steering play when the steering mechanism of mobile machine is actuated in a left-to-right (L-R) and in a right-to-left (R-L) direction) and stores these dead band values as discrete values. Thus, when mobile machine 105 is controlled by system 100, dead band steering control system 160 can provide dead band steering to control component 120 to assist in more precisely controlling mobile machine 105.

For example, while providing course corrections for mobile machine 105, system 100 will often turn the steering wheel of mobile machine 105 in the L-R and R-L directions. However, when control component 120 is going to implement a course correction for mobile machine 105, dead band steering control system 160 will determine if the course correction requires a reverse of the steering mechanism and send a steering compensation value to controller 120 to account for the steering play in the direction in which the steering mechanism is to be actuated. Thus, if a turn to the left is to be implemented by controller 120 and dead band steering control system 160 determines that the steering wheel will have to be reversed to implement that turn, dead band steering control system 160 will send a steering compensation value for substantially eliminating the steering play when the steering wheel is turned in the R-L direction. Controller 120 will then add that steering compensation value to the steering input to implement the course correction. As discussed above, the steering compensation value may be different in the L-R and R-L directions depending upon the steering mechanism of mobile machine 105. By storing separate dead band values for each direction, embodiments of the present invention are able to more precisely control the guidance of mobile machine 105.

Figure 2:
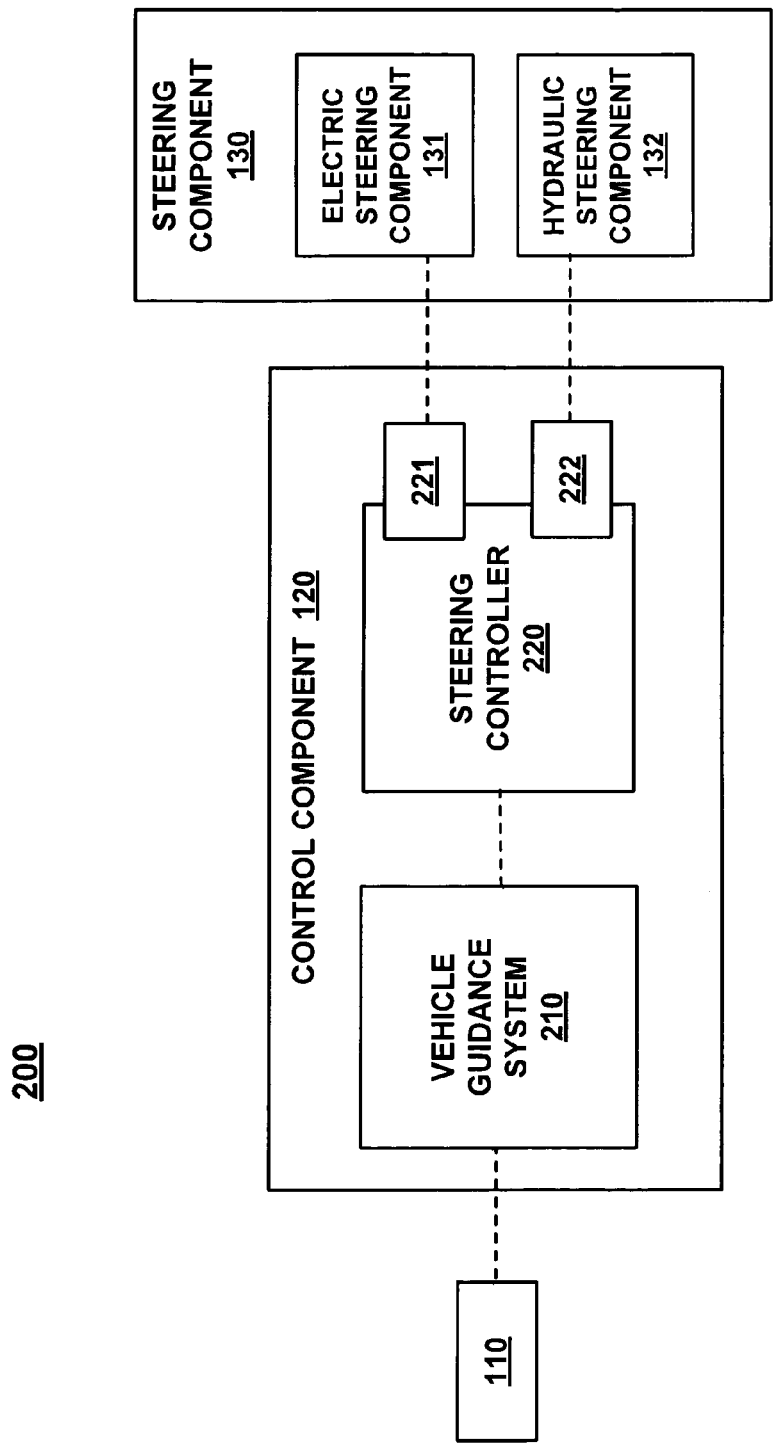
FIG. 2 shows an exemplary system architecture in accordance with embodiments of the present invention.

FIG. 2 shows an exemplary system architecture 200 in accordance with embodiments of the present invention. In the embodiment of FIG. 2, control component 120 comprises a vehicle guidance system 210 which is coupled with a steering controller 220. It is appreciated that in embodiments of the present invention, vehicle guidance system 210 and steering controller 220 may be implemented as a single unit, or separately. Implementing steering controller 220 separately is advantageous in that it facilitates implementing the present invention as an after market kit which can be easily added to an existing vehicle navigation system. As a result, the costs for components and for installation of the control system of the present invention are reduced. However, embodiments of the present invention are well suited to be factory installed as original equipment for mobile machine 105 as well. In one embodiment, vehicle guidance system 210 operates to compensate for a dead band in the steering mechanism of the vehicle.

In embodiments of the present invention, vehicle guidance system 210 uses position data from position determining system 110, user input such as a desired pattern or direction, as well as vector data such as desired direction and distance to determine course corrections which are used for guiding mobile machine 105. Roll, pitch, and yaw data from TCM 150 may also be used to determine course corrections for mobile machine 105. For purposes of the present invention, the term "course correction" means a change in the direction traveled by mobile machine 105 such that mobile machine 105 is guided from a current direction of travel to a desired direction of travel. In embodiments of the present invention, vehicle guidance system 210 may comprise a processor and/or storage media for storing and executing software instructions for controlling a mobile machine. In embodiments of the present invention, vehicle guidance system 210 is a commercially available guidance system such as the AgGPS® guidance system manufactured by Trimble Navigation Ltd. of Sunnyvale Calif.

Additional data used to determine course corrections may also comprise swath calculation which takes into account the width of various implements which may be coupled with mobile machine 105. For example, if a harvester can clear a swath of 15 feet in each pass, vehicle guidance system 210 may generate steering commands which cause mobile machine 105 to move 15 feet to one side in the next pass. Vehicle guidance system 210 may also be programmed to follow straight or curved paths which is useful when operating in irregularly shaped or contoured fields or in fields disposed around a center pivot. This is also useful in situations in which the path being followed by mobile machine 105 is obscured. For example, an operator of a snowplow may not be able to see the road being cleared due to the accumulation of snow on the road. Additionally, visibility may be obscured by snow, rain, or fog. Thus, it would be advantageous to utilize embodiments of the present invention to guide mobile machine 105 in these conditions. In embodiments of the present invention, position determining component 110 may be integrated into vehicle guidance system 210 or may be a separate unit. Additionally, as stated above with reference to FIG. 1, position determining component 110, control component 120 and steering component 130 may be integrated into a single unit in embodiments of the present invention.

In embodiments of the present invention, the course correction calculated by vehicle guidance system 210 is sent from vehicle guidance system 210 to steering controller 220.

Steering controller 220 translates the course correction generated by guidance system 210 into a steering command for manipulating the steering mechanism of mobile machine 105. Steering controller 220 generates a message conveying the steering command to steering component 130. In embodiments of the present invention, the communicative coupling between vehicle guidance system 210, steering controller 220 and steering component 130 is accomplished using coupling 115 (e.g., a serial bus, or CAN bus).

In embodiments of the present invention, steering component 130 may comprise an electric steering component 131, or a hydraulic steering component 132. Thus, as shown in FIG. 2, steering controller 220 comprises a first output 221 for coupling steering controller 220 with electric steering component 131, and a second output 222 for coupling steering controller 220 with hydraulic steering component 132. Because coupling 115 may be compliant with the CAN protocol, plug and play functionality is facilitated in system 200. Therefore, in embodiments of the present invention, steering controller can determine which steering component it is coupled with depending upon which output of steering controller 220 is used.

Steering controller 220 then generates a message, based upon the steering component with which it is coupled, which causes the steering component to actuate the steering mechanism of mobile machine 105. For example, if steering controller 220 determines that output 221 is being used, it generates a steering command which is formatted for controlling electric steering component 131. If steering controller 220 determines that output 222 is being used, it generates a steering command which is formatted for controlling hydraulic steering component 132.

Figure 3A:
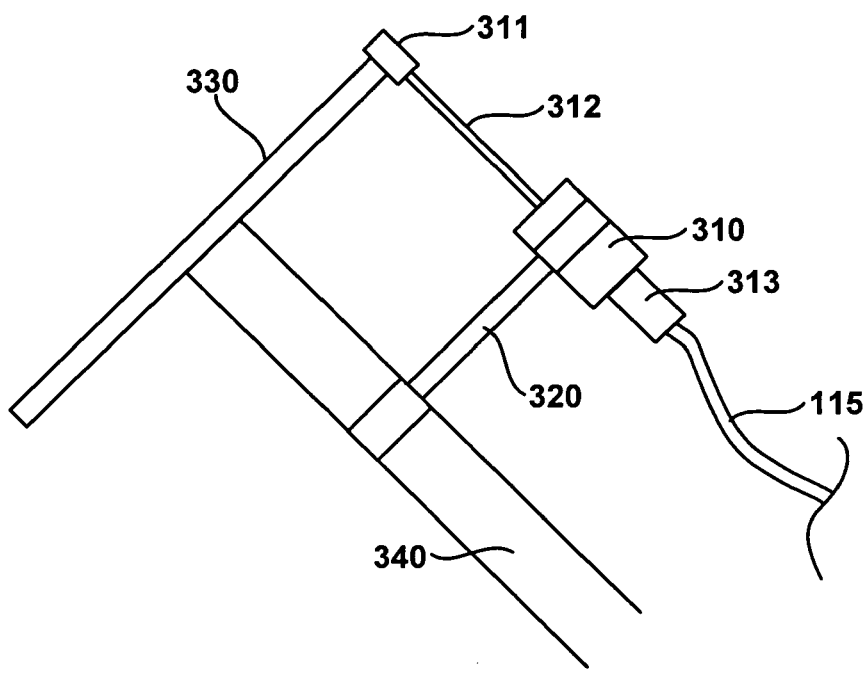
FIGS. 3A and 3B show side and top views respectively of an exemplary system for controlling a mobile machine in accordance with embodiments of the present invention.
Figure 3B:
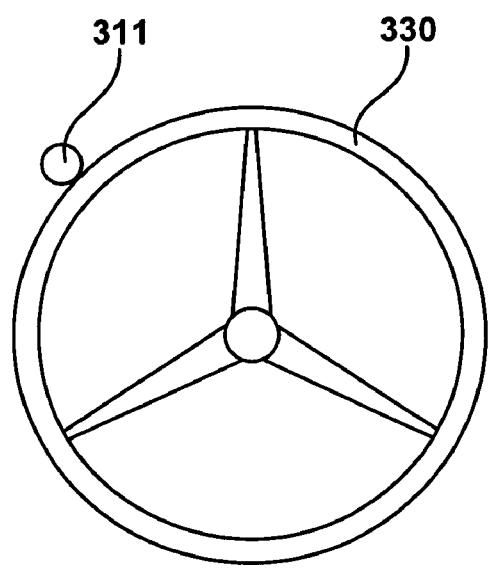

FIGS. 3A and 3B show side and top views respectively of a system 300 for controlling a mobile machine in accordance with embodiments of the present invention. In the embodiment of FIG. 3A, a steering component (e.g., electric steering component 131 of FIG. 2) comprises an electric motor 310 which is coupled with an actuator device via a shaft 312. In the embodiment of FIG. 3A, actuator device comprises a drive wheel 311 which is in contact with steering wheel 330 of mobile machine 105. In embodiments of the present invention, electric motor 310 may be directly coupled with drive wheel 311, or may be coupled via a low ratio gear (not shown). Using these methods to couple electric motor 313 and drive wheel 311 are advantageous in that a smaller electric motor can be used while still generating sufficient torque to control steering wheel 330. Thus, if a user wants to manually steer mobile machine 105, the user will encounter less resistance from electric motor 310 when it is disengaged.

Electric steering component 131 further comprises a motor control unit 313 is coupled with electric motor 310 and with a control component 120 of FIG. 2 via coupling 115. In FIG. 3A, electric motor 310 is coupled with the steering column 340 via a bracket 320. It is appreciated that in embodiments of the present invention, electric motor 310 may be coupled with steering column 340 using another apparatus than bracket 320. For example, in one embodiment, electric motor 310 may be coupled with a bracket which is attached via suction cups with the windshield or dashboard of mobile machine 105. In another embodiment, electric motor 310 may be coupled with a pole which is extended between the floor and roof of mobile machine 105. Furthermore, while the present embodiment shows motor control unit 313 directly coupled with electric motor 310, embodiments of the present invention are well suited to utilize other configurations. For example, in one embodiment motor control unit 313 may be implemented as a sub-component of control unit 120 and may only send a control voltage to electric motor 310 via an electrical coupling (not shown). In another embodiment, motor control unit 313 may be implemented as a separate unit which is communicatively coupled with control unit 120 via coupling 115 and with electric motor 310 via an electrical coupling (not shown).

In embodiments of the present invention, drive wheel 311 is coupled with steering wheel 330 with sufficient friction such that rotation of drive 311 causes rotation of steering wheel 330. In embodiments of the present invention, a spring (not shown) maintains sufficient pressure for coupling drive wheel 311 with steering wheel 330. However, the spring does not maintain sufficient pressure between drive wheel 311 and steering wheel 330 to pinch a user's fingers if, for example, the user is manually steering mobile machine 105 and the user's fingers pass between drive wheel 311 and steering wheel 330.

In embodiments of the present invention, electric motor 310 is reversible, thus, depending upon the steering command sent from control component 120, motor control unit 313 controls the current to electric motor 310 such that it rotates in a clockwise of counter-clockwise direction. As a result, steering wheel 330 is turned in a clockwise or counter-clockwise direction as well. Typically, the current running through electric motor 310 is calibrated so that drive wheel 311 is turning steering wheel 330 without generating excessive torque. This facilitates allowing a user to override electric steering component 131. In embodiments of the present invention, electric motor 310 may be a permanent magnet brush direct current (DC) motor, a brushless DC motor, a stepper motor, or an alternating current (AC) motor.

In embodiments of the present invention, motor control unit 313 can detect when a user is turning steering wheel 330 in a direction counter to the direction electric steering component 131 is turning. For example, a shaft encoder (not shown) may be used to determine which direction shaft 312 is turning. Thus, when a user turns steering wheel 330 in a direction which counters the direction electric motor 310 is turning, the shaft encoder detects that the user is turning steering wheel 330 and generates a signal to motor control unit 313. In response to determining that a user is turning steering wheel 330, motor control unit 313 can disengage the power supplied to electric motor 310. As a result, electric motor 310 is now freewheeling and can be more easily operated by the user. In another embodiment, motor control unit 313 when steering wheel 330 is turned counter to the direction electric motor is turning, a circuit in motor control unit 313 detects that electric motor 310 is stalling and disengages the power supplied to electric motor 310. In another embodiment, a switch detects the rotation of steering wheel 330 and sends a signal to motor control unit 313. Motor control unit 313 can then determine that the user is manually steering mobile machine 105 and disengage electric motor 310. As a result, when a user turns steering wheel 330, their fingers will not be pinched if they pass between drive wheel 311 and steering wheel 330 because electric motor 310 is freewheeling when the power is disengaged.

Embodiments of the present invention are advantageous over conventional vehicle control systems in that it can be easily and quickly installed as an after market kit. For example, conventional control systems typically control a vehicle using solenoids and hydraulic flow valves which are coupled with the power steering mechanism of the vehicle. These systems are more difficult to install and more expensive than the above described system due to the higher cost of the solenoids and hydraulic flow valves as well as the additional labor involved in installing the system. The embodiment of FIG. 3 can be easily bolted onto steering column 340 and coupled with steering controller 220. Additionally, electric motor 310 can be fitted to a variety of vehicles by simply exchanging bracket 320 for one configured for a particular vehicle model. Furthermore, embodiments of the present invention do not rely upon furrow feelers which typically must be raised from and lowered into a furrow when the end of the furrow is reached. As a result, less time is lost in raising or lowering the furrow feeler.

Figure 4A:
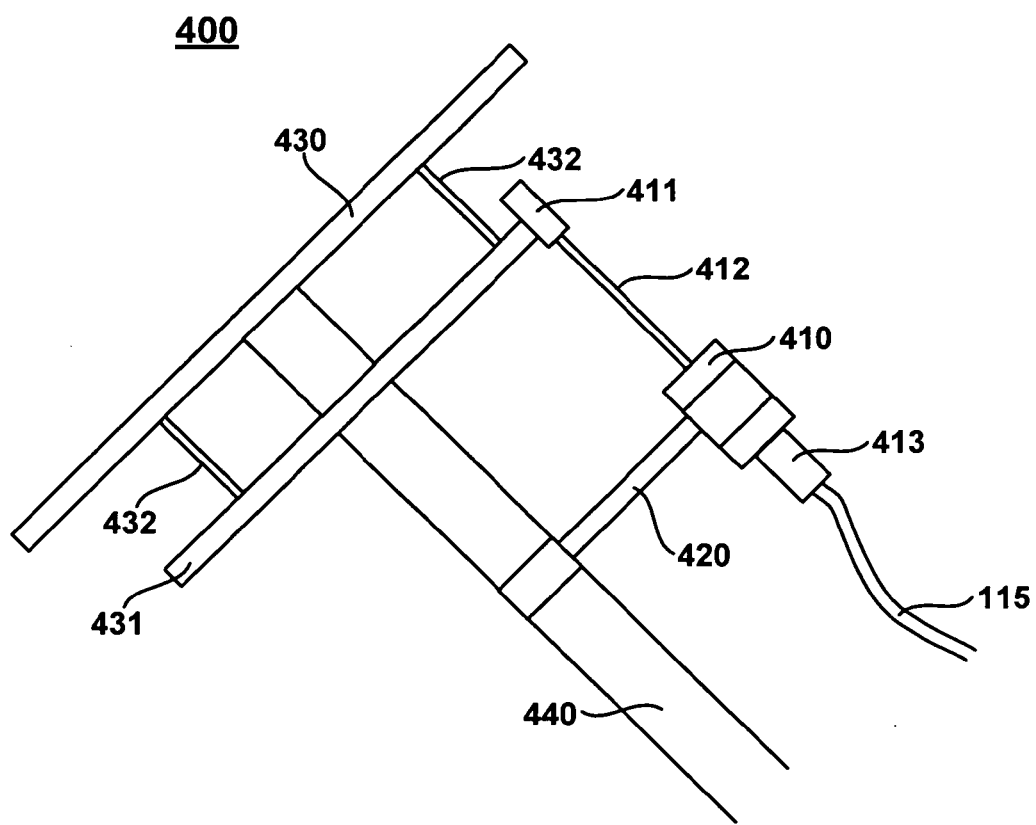
FIGS. 4A and 4B show side and top views respectively of an exemplary system for controlling a mobile machine in accordance with embodiments of the present invention.
Figure 4B:
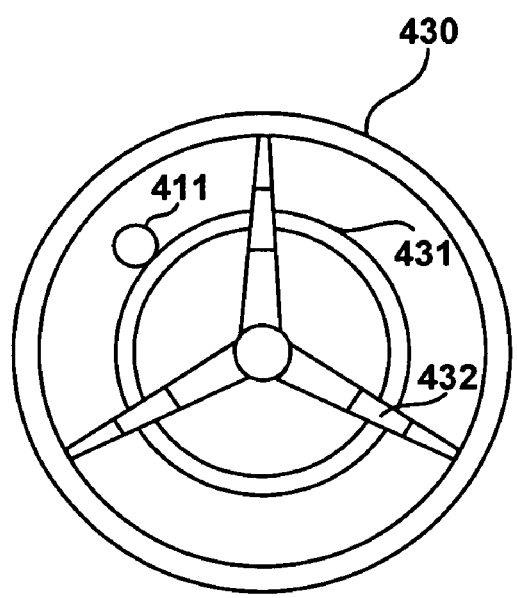

FIGS. 4A and 4B show side and top views respectively of a system 400 for controlling a mobile machine in accordance with embodiments of the present invention. In FIG. 4A, the steering component (e.g., electric steering component 131 of FIG. 2) comprises an electric motor 410 which is coupled with drive wheel 411 via shaft 412 and a motor control unit 413. Motor control unit 413 couples electric motor 410 with steering controller 220 of FIG. 2. In FIG. 4A, electric motor 410 is with steering column 440 via bracket 420. In the embodiment of FIGS. 4A and 4B, drive wheel 411 is coupled with a sub wheel 431 which is coupled with steering wheel 330 via brackets 432.

In the embodiment of FIGS. 4A and 4B, electric motor 410 turns in a clockwise or counter-clockwise direction depending upon the steering command received by motor control unit 413. As a result, drive wheel 411 causes sub wheel 431 to turn in clockwise or counter clockwise direction as well. Utilizing sub wheel 431 prevents a user's fingers from being pinched between steering wheel 430 and drive wheel 411 if the user chooses to manually steer the vehicle. In embodiments of the present invention, sub wheel 431 can be easily and quickly coupled with steering wheel 430 by, for example, attaching brackets 432 to the spokes of steering wheel 430.

Figure 5A:
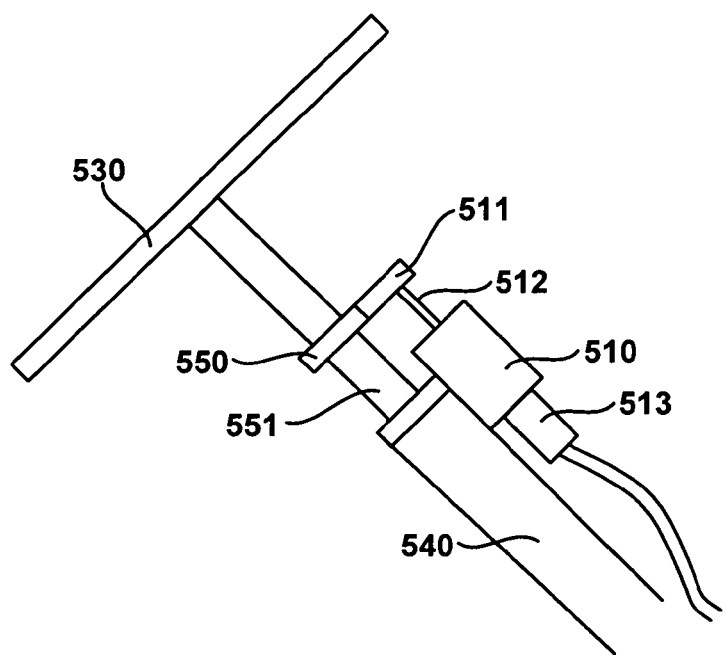
FIGS. 5A and 5B show side and top views respectively of an exemplary system for controlling a mobile machine in accordance with embodiments of the present invention.
Figure 5B:
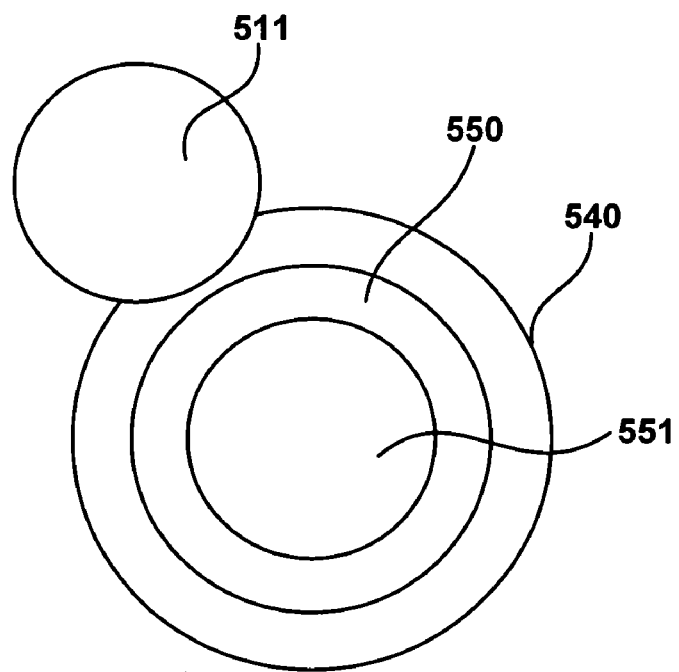

FIGS. 5A and 5B are side and sectional views respectively of a system 500 for controlling a mobile machine in accordance with embodiments of the present invention. In FIG. 5A, the steering component (e.g., electric steering component 131 of FIG. 2) comprises an electric motor 510 which is coupled with gear 511 via shaft 512 and with a motor control unit 513. Motor control unit 413 couples electric motor 510 with steering controller 220 of FIG. 2. In FIG. 5A, electric motor 510 is coupled with steering column 540.

FIG. 5B is a section view of system 500 and shows steering shaft 550 disposed within steering column 540. A gear 551 couples steering shaft 550 with gear 511 of electric steering component 131. In the present embodiment, electric motor 510 turns in a clockwise or counter clockwise direction depending upon the steering command received by motor control unit 513. As a result, gear 511 also turns in a clockwise or counter clockwise direction, thus causing steering shaft 550 to turn due to the force conveyed by gear 551. While the present embodiment recites coupling electric steering component 131 with steering shaft 550 using gears, embodiments of the present invention are well suited for using other mechanical couplings such as a gear and chain, a belt and pulleys, etc.

Figure 6:
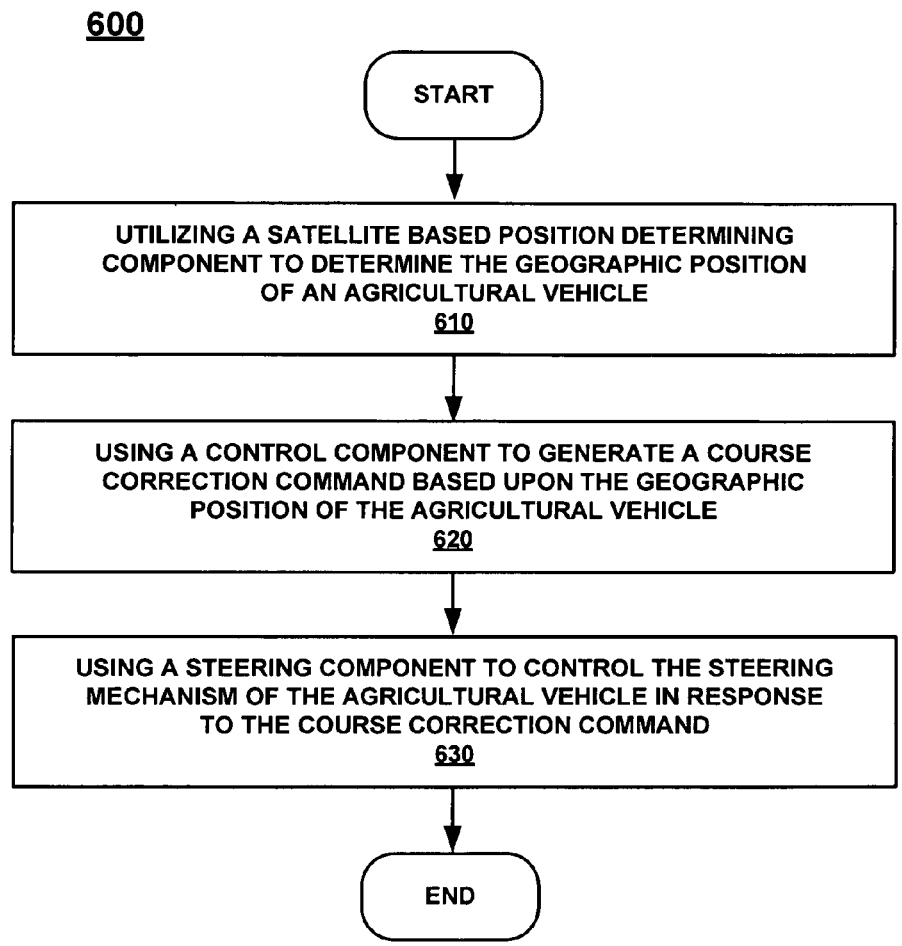
FIG. 6 is a flowchart of an exemplary method for controlling a vehicle in accordance with embodiments of the present invention.

FIG. 6 is a flow chart of a method 600 for controlling an vehicle (e.g., an agricultural, maintenance, utility, commercial vehicle, etc.) in accordance with embodiments of the present invention. In step 610 of FIG. 6, a satellite based position determining component is utilized to determine the geographic position of an agricultural vehicle. As described above with reference to FIG. 1, position determining component 110 is a satellite based position determining system such as global positioning system (GPS) navigation system, a differential GPS system, a real-time kinematics (RTK) system, a networked RTK system, etc. Position determining system determines the location of mobile machine 105 in at least two dimensions in embodiments of the present invention.

In step 620 of FIG. 6, a control component is used to generate a steering command based upon the geographic position of the agricultural vehicle. As described above with reference to FIG. 2, control component 120 is used to generate steering commands for mobile machine based upon geographic data received from position determining component 110. In embodiments of the present invention, control component 120 comprises a vehicle guidance system (e.g., 210 of FIG. 2) which is coupled with a steering controller (e.g., 220 of FIG. 2). Vehicle guidance system 210 uses the position data received from position determining component 110 to determine course corrections for mobile machine 105. Steering controller 220 translates the course corrections into steering commands In step 630 of FIG. 6, a steering component is used to control the steering mechanism of the agricultural vehicle in response to the steering command.

Section II

Method and System for Controlling Steering Deadband in a Mobile Machine

Embodiments of the present invention provide a method and system for controlling steering dead band in a mobile machine.

Exemplary Processes

Figure 7:
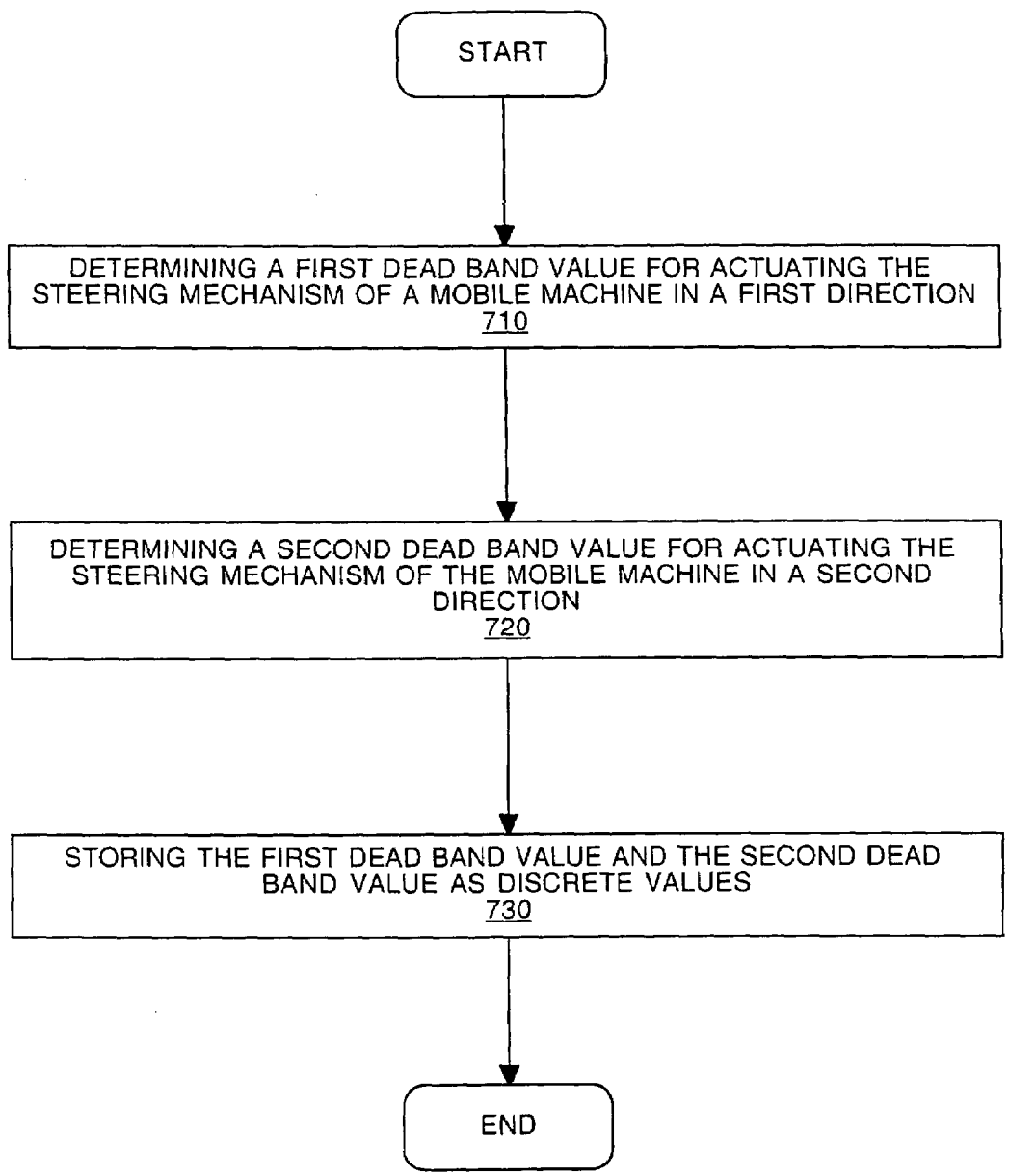
FIG. 7 is a flowchart of an exemplary method for compensating for a steering dead band in a mobile machine, according to an embodiment of the present invention.

FIG. 7 is a flowchart of an exemplary method 700 for compensating for a steering dead band in a mobile machine, according to an embodiment of the present invention. In step 710 of FIG. 7, a first dead band value is determined for actuating the steering mechanism of a mobile machine in a first direction. As will be discussed in greater detail below with reference to FIG. 9, embodiments of the present invention determine a first dead band value in a first direction prior to determining a dead band value in a second direction. As an example, embodiments of the present invention can be used in an automatic mode, or in a manual mode in which user input is utilized, to determine a first dead band value (e.g., the free play in steering wheel 330 of FIG. 3) when the steering wheel is turned to the left.

In step 720 of FIG. 7, a second dead band value is determined for actuating the steering mechanism of a mobile machine in a second direction. Embodiments of the present invention also determine a second dead band value (e.g., the free play in steering wheel 330) when the steering wheel is turned to the right.

In step 730 of FIG. 7, the first dead band value and the second dead band value are stored as discrete values. Storing the dead band values as separate, discrete values is advantageous in that embodiments of the present invention can compensate for steering bias which can occur in some vehicles. For example, in some vehicles, may leak hydraulic fluid, or more hydraulic fluid, when the steering wheel is turned in one direction than when the steering wheel is turned in the other direction. As a result, when the steering wheel is turned, for example, to the left, some of the hydraulic fluid leaks out before the wheels of the mobile machine turn to the left. Thus, in vehicles which are traveling in a straight line the steering wheel will slowly turn in one direction while maintaining a straight course. As an example, a user may be steering in a straight line with their hands maintained in the same position on the steering wheel. However, while driving in a straight line, the user will notice that their hands are slowly rotating the steering wheel in one direction or another in order to maintain the vehicle's course.

Conventional prior art solutions to dead band compensation fail to account for this phenomenon. Instead, prior art solutions measure the entire dead band and divide that number by two, thus providing an average solution rather than one that accounts for steering bias. In other words, the dead band compensation applies the same amount of steering compensation when steering to the left as it does when steering to the right. As a result, in vehicles which exhibit steering bias, the dead band compensation over-compensates in one direction and under-compensates in the other.

In embodiments of the present invention, the dead band is measured separately in both directions and the dead band values are stored as discrete values. Thus, the dead band compensation provided by embodiments of the present invention when the vehicle is steering to the left can be different than the dead band compensation provided when the vehicle is steering to the right.

Figure 8:
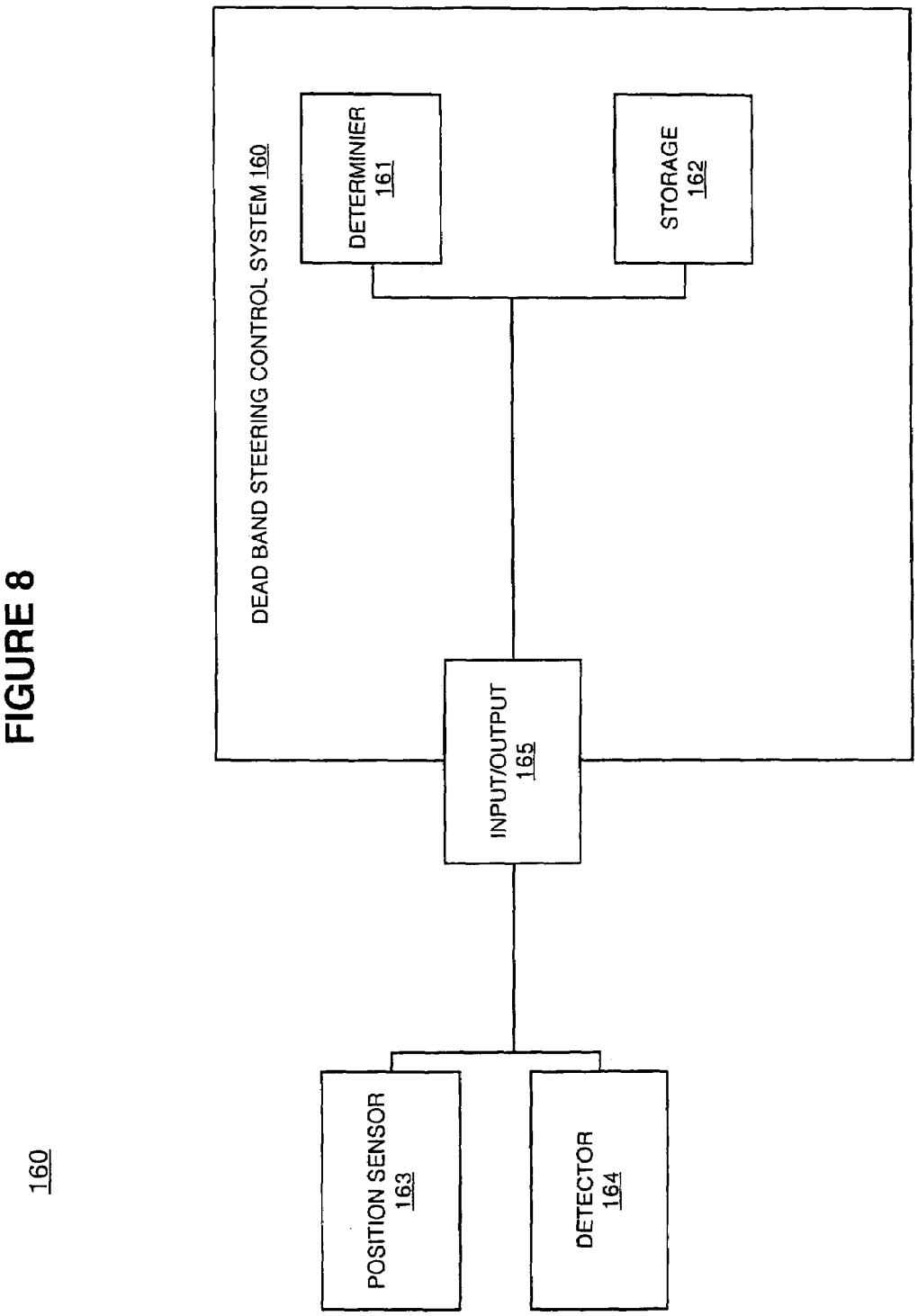
FIG. 8 shows an exemplary dead band steering control system in accordance with embodiments of the present invention.

FIG. 8 shows an exemplary dead band steering control system 160 in accordance with embodiments of the present invention. In the embodiment of FIG. 8, dead band steering control system 160 comprises a determiner 161 which is communicatively coupled with a storage medium 162 and an input/output 165. Input/output 165 is further communicatively coupled with a position sensor 163 and a detector 164. It is noted that while FIG. 8 shows dead band steering control system 160 as a separate component of system 100, in embodiments of the present invention, the components shown in FIG. 8 may be integrated with other components of system 100.

Determiner 160 is for determining a first dead band value and a second dead band value for mobile machine. As will be described in greater detail below, in embodiments of the present invention, a separate dead band value is determined and stored when the steering wheel of mobile machine 105 is steered to the left and to the right. In embodiments of the present invention, determiner 160 may be implemented as a discrete component of dead band steering control system 160, or may be implemented as a function of, for example, vehicle guidance system 210.

Storage medium 165 is for storing the first dead band value and the second dead band value as discrete values generated by determiner 161. In embodiments of the present invention, storage medium 165 comprises non-volatile memory, volatile memory, a removable memory storage medium, or the like. In one embodiment, storage media 165 may be implemented as a component of vehicle guidance system 210.

In embodiments of the present invention, position sensor 163 is for noting the position of the steering wheel of mobile machine 105 (e.g., steering wheel 330 of FIG. 3). In embodiments of the present invention, this may be implemented using, for example, motor control unit 313 which may be operable for detecting the position of shaft 312. In another embodiment, position sensor 163 is a separate component which is operable for determining the difference in position of steering wheel 330 when it is turned. For example, the difference between a first steering wheel position of steering wheel 330 and a second steering wheel position after it has been actuated can be given as an angle wherein the rays of the angle comprise the radius of the steering wheel at the first and second steering wheel positions, e.g., at the points at which they intersect with the steering wheel circumference. This angular value corresponding to the difference between the first steering wheel position and the second steering wheel position can be stored and/or applied in any angular measurement form, such as radians, gradients and/or degrees.

The difference between the first steering wheel position and the second steering wheel position can also be given as an partial circumferential distance corresponding to the portion of the steering wheel circumference scribed by the angle corresponding to the difference between the first steering wheel position and the second steering wheel position. Further, the difference between the first steering wheel position and the second steering wheel position can be given as the length of a secant scribed by the intersection of the angle corresponding to the difference between the first steering wheel position, the second steering wheel position, and the steering wheel circumference. Likewise, the difference between the first steering wheel position and a third steering wheel position can be described. Embodiments of the present invention are well suited to function with the difference between the first and second steering component positions given in any such form, any combination thereof and/or other descriptions thereof.

In embodiments of the present invention, detector 164 is for detecting the movement of the steering ground wheels of mobile machine in response to a movement of steering wheel 330 is a first direction or a second direction (e.g., to the left or to the right). In one embodiment, detector 164 may utilize a wheel angle sensor to detect movement of the ground steering wheels (e.g., 105a of FIG. 1B). In another embodiment, detector 164 may be operable for detecting movement of mobile machine 105 from a desired direction to a second direction. In one embodiment, detector 164 may comprise device which shows an angular deviation of mobile machine 105 from a desired direction. For example, detector 164 may comprise a yaw indicator (e.g., a yaw gyroscope implemented in TCS 150, a compass, or another direction indicating device). In anther embodiment, position determining system 110 may detect the angular deviation of mobile machine 105 from a desired direction. For example, a GPS heading calculation, a calculation of the change in position over a change in time, or another method may be used by position determining system 110 to detect an change in the direction of mobile machine 105 from a desired direction. While automatic detection of the movement of the steering ground wheels of mobile machine 105 is disclosed, in embodiments of the present invention a user may manually indicate the movement of the wheels instead.

Figure 9A:
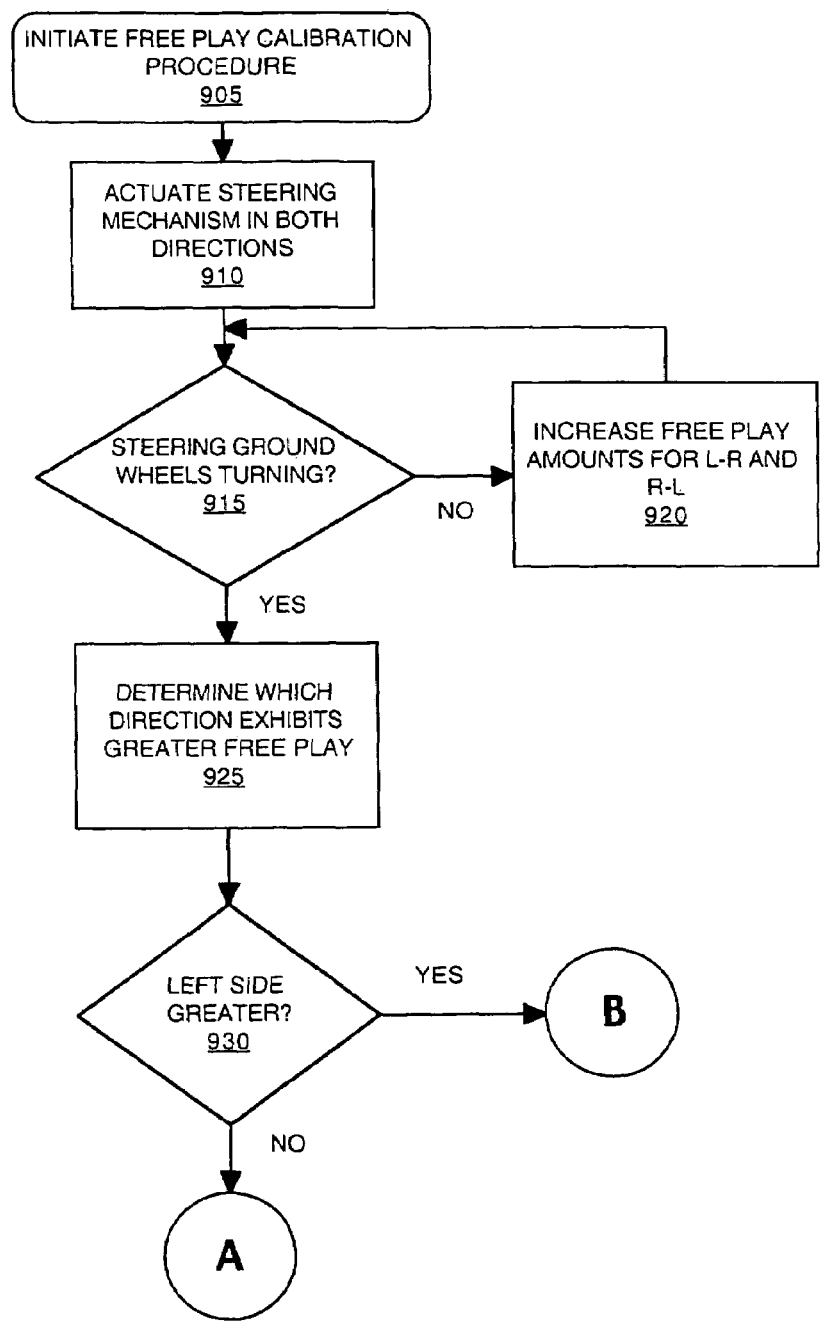
FIGS. 9A, 9B, and 9C are a flowchart of an exemplary procedure for calibrating a dead band compensating system in accordance with embodiments of the present invention.
Figure 9B:
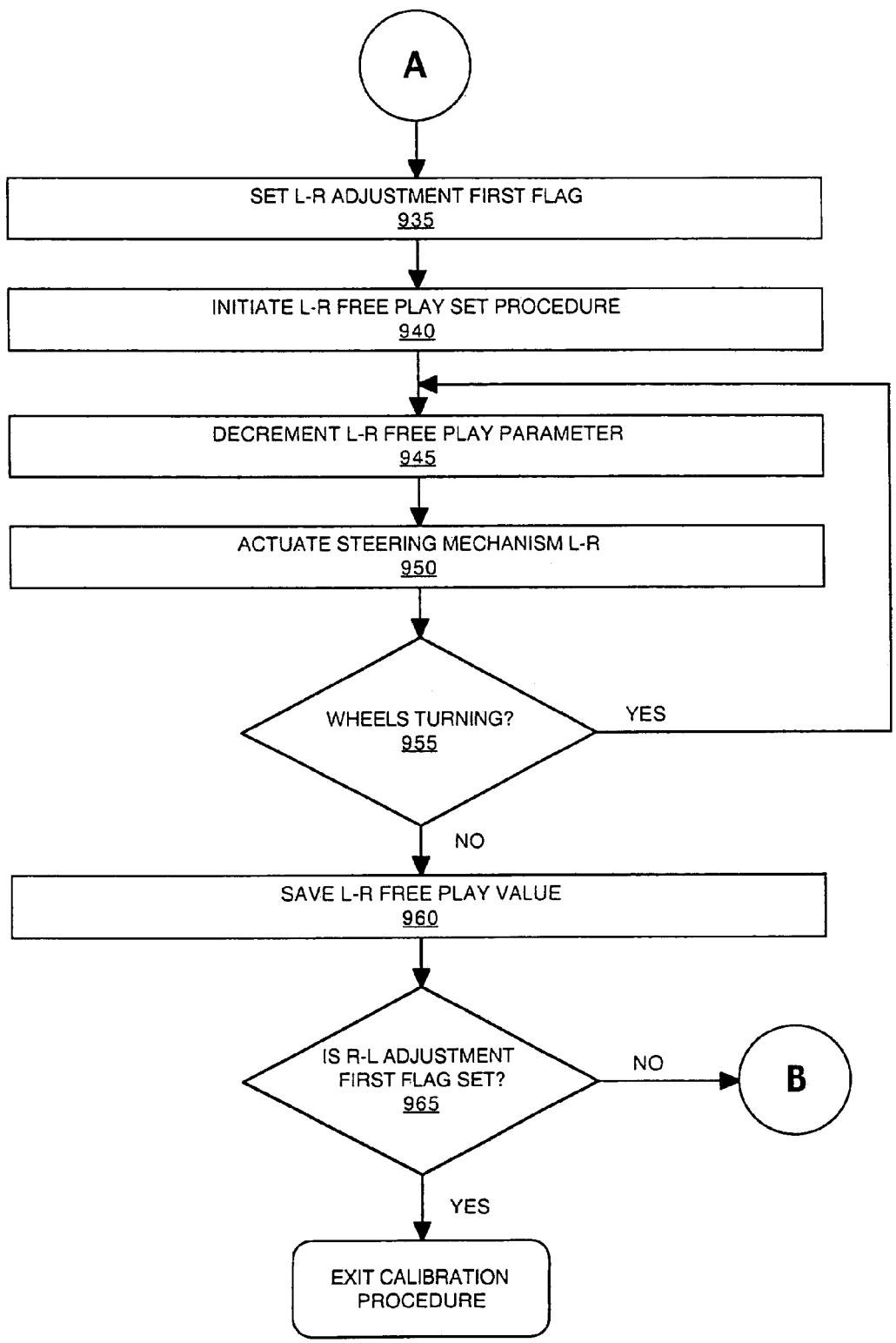
Figure 9C:
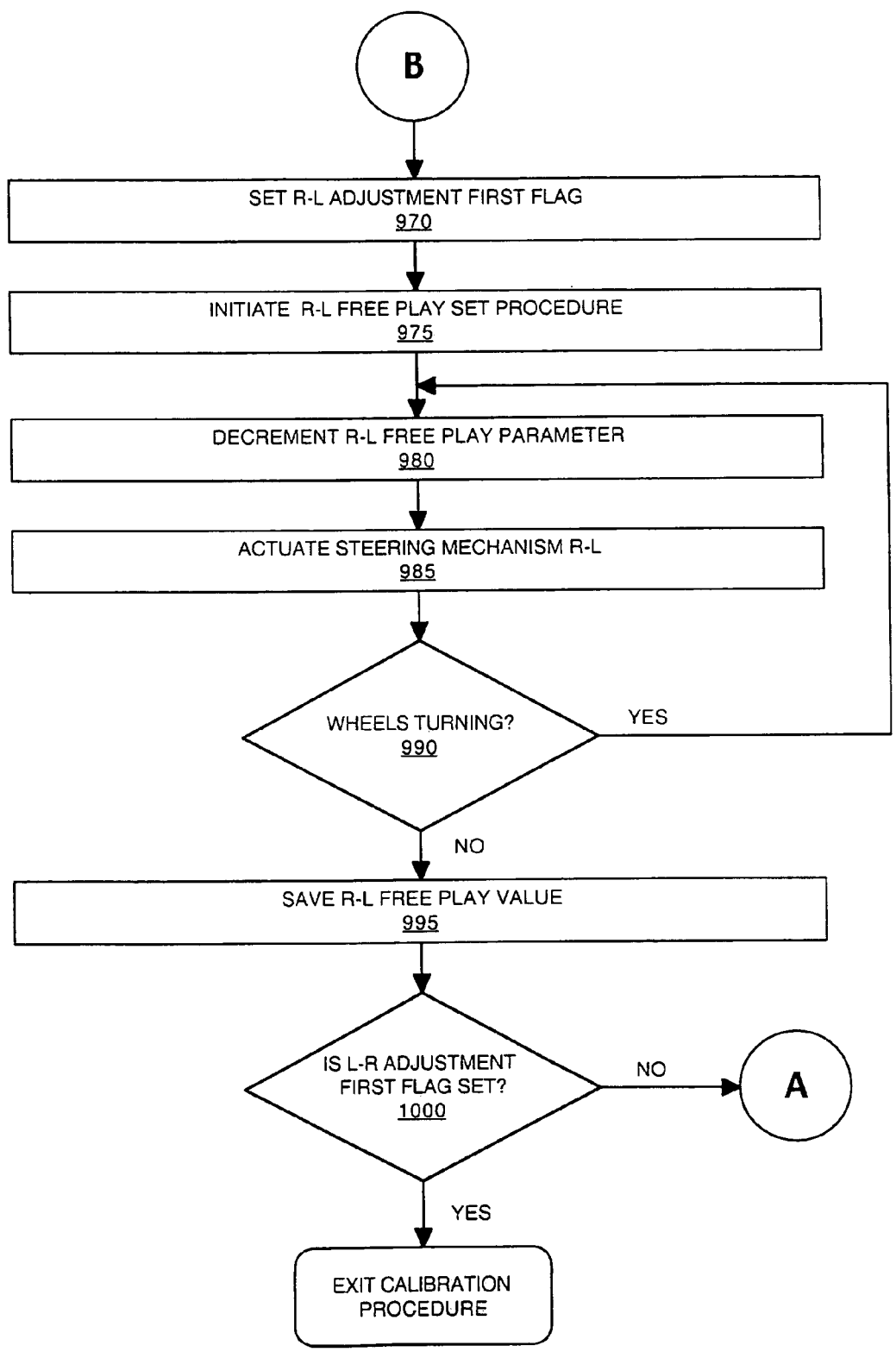

FIGS. 9A, 9B, and 9C are a flowchart of an exemplary procedure 900 for calibrating a dead band compensating system in accordance with embodiments of the present invention. In step 905 of FIG. 9A, the free play calibration procedure is initiated. In embodiments of the present invention, a user may select a manual free play calibration or an automated free play calibration. The following discussion will be directed toward an automated free play calibration procedure while indicating which steps in the procedure would be performed by a user in the manual calibration mode as appropriate.

In step 910 of FIG. 9A, system 100 turns actuates the steering mechanism in both directions. In embodiments of the present invention, system 100 may actuate the steering wheel (e.g., 330) of mobile machine 105 in both directions. For example, the steering wheel may be actuated such that it turns in clockwise direction, which will hereinafter be referred to as a "left-to-right, or L-R" direction. The steering wheel may then be actuated such that it turns in a counter-clockwise direction, hereinafter referred to as a "right-to-left, or R-L" direction.

In one embodiment of the present invention, steering wheel 330 is moved the same amount in both the L-R direction and the R-L direction. In another embodiment of the present invention, steering wheel 330 is moved in both directions by whatever amount is needed such that the steering ground wheels (e.g., 105a of FIG. 1B) are deflected by the same amount in their respective directions. For example, in order to cause the steering ground wheels of mobile machine 105 to deflect 5 degrees from the longitudinal axis in the left direction, steering wheel 330 may have to be actuated to turn 45 degrees in the L-R direction. However, to cause the steering ground wheels of mobile machine 105 to deflect 5 degrees from the longitudinal axis in the right direction, steering wheel 330 may have to be actuated to turn 75 degrees in the R-L direction. Thus, in embodiments of the present invention, either steering wheel rotation or steering ground wheel deflection may be held as a constant.

Alternatively, if procedure 900 is performed in a manual calibration mode the user may actuate steering wheel 330 to determine which direction requires a greater amount of steering input to maintain a straight course while mobile machine 105 is moving.

In step 915 of FIG. 9A, a logical process is performed to determine if the steering ground wheels of the mobile machine are turning in response to actuating the steering mechanism in both directions. When procedure 900 is implemented in a manual calibration mode, the user may simply indicate, using keypad 140 for example, whether the steering ground wheels of mobile machine 105 are turning in both directions in response to actuating the steering wheel 330 in both directions. In one embodiment, the user may indicate whether the L-R or the R-L direction requires more steering input in order to maintain a straight course for mobile machine 105 while it is in motion. Alternatively, if the steering wheel rotation is held constant, the user may indicate, via keypad 140 for example, whether the steering ground wheels turn in both directions in response to actuating the steering wheel as well as whether the L-R direction or the R-L direction results in a greater deflection of the ground steering wheels when steering wheel 330 is turned by the same amount in both directions.

If procedure 900 is performed in an automatic mode, detecting the deflection of the steering ground wheels of mobile machine 105 may be performed by detector 164. For example, if detector 164 comprises a wheel angle sensor, deflection of the steering ground wheels from the longitudinal axis of mobile machine 105 is detected in response to actuating the steering mechanism. In another embodiment, detector 164 comprises a device which shows an angular deviation of mobile machine 105 from a desired direction. Thus, when steering wheel 330 is actuated in the L-R and R-L directions, mobile machine 105 a deflection of mobile machine 105 in that respective direction will be detected. If it is determined that the steering ground wheels are turning in both directions, procedure 900 continues at step 925. If it is determined that the steering ground wheels are not turning at step 915, procedure 900 proceeds to step 920.

In step 920 of FIG. 9A, if the steering ground wheels of mobile machine 105 do not turn in both directions in response to actuating the steering mechanism, the amount of free play in increased in the L-R direction and the R-L directions. In embodiments of the present invention, if the steering ground wheels do not turn in both directions in response to corresponding actuation of the steering mechanism, the free play parameters of dead band steering control system 160 are increased in the L-R and R-L directions. As a result, in a successive actuation of the steering mechanism, the steering wheel will be actuated to turn a greater amount. For example, if a first actuation of steering wheel 330 of 45 degrees to either direction does not result in a corresponding deflection of the steering ground wheels of mobile machine 105, in step 920 the parameter for actuating steering wheel 330 is increased so that in the next actuation, the steering wheel will be actuated 50 degrees. In embodiments of the present invention, this process is repeated until the steering ground wheels turn in both directions in response to L-R and R-L actuations of the steering wheel.

If procedure 900 is implemented in a manual calibration mode, the user may simply rotate steering wheel 330 is both directions such that a respective turning of the steering ground wheels of mobile machine 105 is detected or observed. In embodiments of the present invention, the position of steering wheel may be detected (e.g., using motor control unit 313) and noted upon determining that the steering ground wheels are turning in both directions.

In step 925 of FIG. 9A, it is determined that one steering direction exhibits greater free play than the other. In one embodiment of the present invention, dead band steering control system 160 automatically determines whether one steering direction exhibits greater free play than the other. For example, determiner 161 can determine that while a change in the course of mobile machine 105 to the left occurs when steering wheel 330 is rotated 45 degrees to the left, no change in course to right occurs until steering wheel 330 is rotated 60 degrees to the right. Thus, there is greater free play in the L-R direction than in the R-L direction. If procedure 900 is implemented in the manual calibration mode, the user may simply enter (e.g., using keypad 140) that there is greater free play to the right than to the left.

In step 930 of FIG. 9A, a logical process is performed to whether the left or right side exhibits greater free play. In the present embodiment step 930 determines whether the L-R free play set procedure or the R-L free play set procedure occurs first. In embodiments of the present invention, the steering direction which exhibits the greater amount of free play is calibrated first. If the left side steering exhibits greater free play (e.g., the steering wheel must be rotated farther to the left to cause the steering ground wheels to move), procedure 900 continues at step 970. If the right side steering exhibits greater free play (e.g., the steering wheel must be rotated farther to the right to cause the steering ground wheels to move), procedure 900 continues at step 935.

In step 935 of FIG. 9B, the L-R adjustment first flag is set. In embodiments of the present invention, this flag is set to prevent dead band steering control system 160 from entering a logical loop in which free play adjustment of the steering mechanism is constantly repeated. After setting this flag, procedure 900 continues to step 940.

In step 940 of FIG. 9B, the L-R free play set procedure is initiated. In embodiments of the present invention, a free play set procedure comprises a L-R free play set procedure and a R-L free play set procedure. While described as separate processes in the present embodiment, for the purposes of the present application the L-R and the R-L free play set procedures (e.g., steps 940 and 975 respectively of FIG. 9) a parts of a single free play set procedure. In embodiments of the present invention, the free play set procedure performed by dead band steering control system 160 detects the amount of free play in both the L-R and R-L steering directions and stores a separate discrete value corresponding to the amount of free play in each direction. These values can be later used to compensate for, or "take up," the free play in the steering mechanism before applying a course correction for mobile machine 105.

In step 945 of FIG. 9B, the L-R free play parameter is decremented. In one embodiment of the present invention, dead band steering control system 160 causes system 100 to initiate a succession of actuations of the steering mechanism of mobile machine 105 in the L-R direction in order to determine the maximum amount of steering input to steering wheel 330 which will not cause the steering ground wheels to move. It is appreciated that the succession of actuations may only comprise one successive actuation of the steering mechanism of mobile machine 105 in order to determine the free play value for that steering direction.

As an example, upon noting the amount of steering input required to cause the steering ground wheels of mobile machine 105 to turn in the L-R direction (e.g., steps 915 and 925 above), dead band steering control system 160 decrements the amount of steering input to steering wheel 330 in a successive actuation of the mechanism. For example, if a steering input of 45 degrees is required to cause a change in the direction of the steering ground wheels of mobile machine 105, in step 945 dead band steering control system 160 will decrement the steering input value to, for example, a steering input of 43 degrees in the next actuation of the steering mechanism. It is noted that steering input to steering wheel 330 may be measured as an angular measurement of rotation, or a linear measurement of the distance traveled by a reference point of steering wheel 330.

In step 950 of FIG. 9B, the steering mechanism is actuated in the L-R direction. In this step, dead band steering control system 160 causes system 100 to actuate the steering mechanism of mobile machine 105 in accordance with the now decremented steering input parameter described above with reference to step 945.

In step 955 of FIG. 9B, a logical process is performed in which it is determined whether the steering ground wheels of mobile machine 105 are turning in response to actuating the steering mechanism according to the decremented free play parameter. A determination of whether the steering ground wheels of mobile machine are turning in response to the actuation of the steering mechanism in accordance with the decremented steering input parameter is made. As described above with reference to step 915, this determination can be performed automatically by dead band steering control system 160, or by a user input when procedure 900 is implemented in a manual calibration mode. In the present embodiment, if the ground wheels are still turning in response to the decremented steering input, procedure 900 returns to step 945 wherein the steering input parameter is further decremented and the steering mechanism is actuated in accordance with the decremented steering input parameter. If it is determined that the steering ground wheels are not turning in response to actuating the steering mechanism of mobile machine 105 in accordance with the decremented steering input parameter, procedure 900 continues at step 960.

In step 960 of FIG. 9B, the L-R free play (e.g., dead band) value is saved. If the steering ground wheels do not turn in response to the decremented steering input parameter, embodiments of the present invention note the position of steering wheel 330 and save that value as the L-R free play value. Again, this value may be measured as an angular rotation, or linear measurement of a fixed point of steering wheel 330 from an initial steering position.

In step 965 of FIG. 9B, a logical process is performed to determine whether the R-L adjustment first flag is set. If the R-L adjustment first flat is not set, procedure 900 proceeds to step 970. If the R-L adjustment first flag is already set, the free play calibration procedure is exited.

In step 970 of FIG. 9C, the R-L adjustment first flag is set. In embodiments of the present invention, this flag is set to prevent dead band steering control system 160 from entering a logical loop in which free play adjustment of the steering mechanism is constantly repeated. After setting this flag, procedure 900 continues to step 975.

In step 975 of FIG. 9C, the R-L free play set procedure is initiated. In embodiments of the present invention, dead band steering control system 160 then enters a R-L free play set procedure in which the amount of free play in this steering direction is detected and recorded. As discussed above, embodiments of the present invention detect a free play value for both the L-R and R-L steering directions.

These values are stored as discrete values which can be later used to compensate for, or "take up" the free play in the steering mechanism, before applying a course correction for mobile machine 105.

In step 980 of FIG. 9C, the R-L free play parameter is decremented. As discussed above with reference to step 945, in embodiments of the present invention, dead band steering control system 160 causes system 100 to initiate a succession of actuations of the steering mechanism of mobile machine 105 in the R-L direction in order to determine the maximum amount of steering input to steering wheel 330 which will not cause the steering ground wheels to move. Again, it is appreciated that the succession of actuations may only comprise one successive actuation of the steering mechanism of mobile machine 105 in order to determine the free play value for that steering direction.

In step 985 of FIG. 9C, the steering mechanism is actuated in the R-L direction. In this step, dead band steering control system 160 causes system 100 to actuate the steering mechanism of mobile machine 105 in accordance with the now decremented steering input parameter described above with reference to step 980.

In step 990 of FIG. 9C, a logical process is performed in which it is determined whether the steering ground wheels of mobile machine 105 are turning in response to actuating the steering mechanism according to the decremented free play parameter. A determination of whether the steering ground wheels of mobile machine are turning in the R-L direction in response to the actuation of the steering mechanism in accordance with the decremented steering input parameter is made. As described above with reference to step 915, this determination can be performed automatically by dead band steering control system 160, or by a user input when procedure 900 is implemented in a manual calibration mode. In the present embodiment, if the ground wheels are still turning in response to the decremented steering input, procedure 900 returns to step 980 wherein the steering input parameter in the R-L direction is further decremented and the steering mechanism is actuated in accordance with the decremented steering input parameter. If it is determined that the steering ground wheels are not turning in response to actuating the steering mechanism of mobile machine 105 in accordance with the decremented steering input parameter, procedure 900 continues at step 995.

In step 995 of FIG. 9C, the R-L free play (e.g., dead band) value is saved. If the steering ground wheels do not turn in response to the decremented steering input parameter, embodiments of the present invention note the position of steering wheel 330 and save that value as the R-L free play value. Again, this value may be measured as an angular rotation, or linear measurement of a fixed point of steering wheel 330 from an initial steering position.

In step 1000 of FIG. 9C, a logical process is performed to determine whether the L-R adjustment first flag is set. If the L-R adjustment first flat is not set, procedure 900 proceeds to step 935. If the L-R adjustment first flag is already set, the free play calibration procedure is exited.

Thus, embodiments of the present invention measure the free play in the steering mechanism of a mobile machine separately in a L-R direction and in a R-L direction and store these as discrete values. In so doing, embodiments of the present invention are able to more precisely implement automatic control of that mobile machine. The dead band values are then used to reduce or eliminate the free play in the steering mechanism so that system 100 can account for the amount of movement allowed by the steering mechanism before the steering ground wheels actually respond to a steering input.

A method and system for controlling steering dead band in a mobile machine, is thus described. While the present invention has been described in particular embodiments, it should be appreciated that the present invention should not be construed as limited by such embodiments, but rather construed according to the following claims.

What is claimed is:

1. A method for compensating for a dead band in a steering mechanism of a mobile machine, comprising:
   determining a first dead band value for actuating said steering mechanism in a first direction wherein a succession of actuations of said steering mechanism are initiated in said first direction and in which the magnitude of each successive actuation is decreased until a first absence of movement of the ground wheels of said mobile machine is detected in response to an actuation of said steering mechanism in said first direction;
   determining a second dead band value for actuating said steering mechanism in a second direction wherein a succession of actuations of said steering mechanism are initiated in said second direction and in which the magnitude of each successive actuation is decreased until a second absence of movement of the ground wheels of said mobile machine is detected in response to an actuation of said steering mechanism in said second direction; and
   storing said first dead band value and said second dead band value as discrete values.

2. The method as recited in claim 1 wherein determining said first dead band value further comprises:
   actuating said steering mechanism in said first direction to a first point until movement of the ground wheels of said mobile machine in said first direction is detected; and
   noting a first position of said steering mechanism corresponding to said first point.

3. The method as recited in claim 2 wherein determining said second dead band value further comprises:
   actuating said steering mechanism in said second direction to a second point until movement of the ground wheels of said mobile machine in said second direction is detected; and
   noting a second position of said steering mechanism corresponding to said second point.

4. The method as recited in claim 3 wherein detecting movement of the ground wheels of said mobile machine is selected from the group consisting essentially of:
   receiving a manual indication of the movement of the ground wheels of said mobile machine in said first direction and in said second direction; and
   automatically detecting movement of the ground wheels of said mobile machine in said first direction and in said second direction.

5. The method as recited in claim 4 wherein detecting movement of the ground wheels of said mobile machine further comprises:
   using a wheel angle sensor to detect movement of the ground wheels of said mobile machine in said first direction and in said second direction.

6. The method as recited in claim 4 wherein detecting movement of the ground wheels of said mobile machine further comprises:
   detecting movement of said mobile machine from a desired direction to a second direction.

7. The method as recited in claim 6 wherein detecting movement from said desired direction further comprises:
receiving an indication of movement from said desired direction, said indication selected from the group consisting essentially of
a position determining system heading;
a compass heading; and
a yaw indication.

8. The method as recited in claim 4 wherein determining said second dead band value further comprises:
determining that said first dead band value is greater than said second dead band value;
noting a third point of said steering mechanism corresponding to the actuation of said steering mechanism at which said first absence of movement of the ground wheels of said mobile machine is detected in said first direction.

9. The method as recited in claim 8 further comprises:
noting a fourth point of said steering mechanism corresponding to the actuation of said steering mechanism at which said second absence of movement of the ground wheels of said mobile machine is detected in said second direction.

10. The method as recited in claim 1 wherein detecting said first absence of movement and said second absence of movement is selected from the group consisting essentially of:
receiving a manual indication of said first absence of movement and said second absence of movement; and
automatically detecting said first absence of movement and said second absence of movement.

11. The method as recited in claim 1 further comprising:
setting a first flag indicating that said second dead band value has been determined; and
setting a second flag indicating that said first dead band value has been determined.

12. The method as recited in claim 1 further comprising:
using said first dead band value and said second dead band value when steering said mobile machine in said first direction and in said second direction respectively.

13. The method as recited in claim 12 further comprising:
sending a signal corresponding to said first dead band value and said second dead band value to a controller used to actuate said steering mechanism.

14. The method as recited in claim 1 wherein said mobile machine comprises a vehicle having at least one of an agricultural application, a maintenance application, a construction application, a utility application, and a commercial application.

15. A system for controlling a mobile machine comprising:
an actuator for operating a steering mechanism of said mobile machine;
a controller coupled with said actuator for automatically actuating said steering mechanism in a first direction according to a first dead band value and for automatically actuating said steering mechanism in a second direction according to a second dead band value and wherein determining said first dead band value and said second dead band value comprises;
initiating a succession of actuations of said steering mechanism in said first direction wherein the magnitude of each successive actuation is decreased until a first absence of movement of the ground wheels of said mobile machine is detected in response to an actuation of said steering mechanism in said first direction; and
initiating a succession of actuations of said steering mechanism in said second direction wherein the magnitude of each successive actuation is decreased until a second absence of movement of the around wheels of said mobile machine is detected in response to an actuation of said steering mechanism in said second direction; and
a determiner coupled with said steering mechanism for determining said first dead band value and said second dead band value; and
a storage medium coupled with said determiner and with said controller for storing said first dead band value and said second dead band value as discrete values.

16. The system of claim 15 further comprising:
a position sensor coupled with said steering mechanism and with said determiner for noting a first position of said steering mechanism that corresponds to a first point at which the ground wheels of said mobile machine are detected to move in response to moving said steering mechanism in said first direction.

17. The system of claim 16 wherein said position sensor is further for noting a second position of said steering mechanism that corresponds to a second point at which the ground wheels of said mobile machine are detected to move in response to moving said steering mechanism in said second direction.

18. The system of claim 17 further comprising:
an input for receiving a manual indication of the movement of the ground wheels of said mobile machine in said first direction and said second direction; and
a detector coupled with said mobile machine for automatically detecting the movement of the ground wheels of said mobile machine in said first direction and said second direction.

19. The system of claim 18, wherein said detector is for detecting a change in the angle of the ground wheels relative to said mobile machine.

20. The system of claim 18 wherein said detector is for detecting movement of said mobile machine from a desired direction to a second direction.

21. The system of claim 20 wherein said detector is selected from the group consisting essentially of:
a position determining system;
a compass; and
a yaw indicator.

22. The system of claim 18 wherein said determiner determines that said second dead band value is greater than said first dead band value and wherein said position sensor notes a third position of said steering mechanism in response to detecting said first absence of movement.

23. The system of claim 22 wherein said position sensor notes a fourth position of said steering mechanism in response to detecting said second absence of movement.

24. The method as recited in claim 15 wherein detecting said first absence of movement and said second absence of movement is selected from the group consisting essentially of:
receiving a manual indication of said first absence of movement and said second absence of movement; and
automatically detecting said first absence of movement and said second absence of movement.

25. The system of claim 15 wherein said determiner is further for setting a first flag indicating that said second dead band value has been determined and for selling a second flag indicating that said first dead band value has been determined.

26. A dead band steering control system comprising:

a determiner for determining a first dead band value for actuating a steering mechanism of a mobile machine wherein a succession of actuations of said steering mechanism are initiated in a first direction and in which the magnitude of each successive actuation is decreased until a first absence of movement of the around wheels of said mobile machine is detected in response to an actuation of said steering mechanism in said first direction and for determining a second dead band value for actuating said steering mechanism wherein a succession of actuations of said steering mechanism are initiated in a second direction and in which the magnitude of each successive actuation is decreased until a second absence of movement of the ground wheels of said mobile machine is detected in response to an actuation of said steering mechanism in said second direction; and a storage medium for storing said first dead band value and said second dead band value as discrete values.

27. The dead band steering control system of claim 26 further comprising:

an input/output for receiving a first position of said steering mechanism, said first position corresponding to a first point to which said steering mechanism is actuated in said first direction until movement of the ground wheels of said mobile machine is detected and wherein said input/output is further for receiving a second position of said steering mechanism, said second position corresponding to a second point to which said steering mechanism is actuated in said second direction until movement of the ground wheels of said mobile machine is detected.

28. The dead band steering control system of claim 27 further comprising:

an input for receiving a manual indication of the movement of the ground wheels of said mobile machine in said first direction and said second direction; and a detector for automatically detecting the movement of the ground wheels of said mobile machine in said first direction and in said second direction.

29. The dead band steering control system of claim 28 wherein said detector is for detecting the angle of the ground wheels relative to a longitudinal axis of said mobile machine.

30. The dead band steering control system of claim 28 wherein said detector is for detecting movement of said mobile machine away from a desired direction.

31. The dead band steering control system of claim 28 wherein said detector is selected from the group consisting essentially of:

a position determining system;

a compass; and a yaw indicator.

32. The dead band steering control system of claim 28 wherein said determiner is further for:

noting a third point of said steering mechanism corresponding to the actuation of said steering mechanism at which said first absence movement of the ground wheels of said mobile machine is detected in said second direction.

33. The dead band steering control system of claim 32 wherein said free play set procedure further comprises:

noting a fourth point of said steering mechanism corresponding to the actuation of said steering mechanism at said second absence of movement of the ground wheels of said mobile machine is detected in said first direction.

34. The method as recited in claim 26 wherein detecting said first absence of movement and said second absence of movement is selected from the group consisting essentially of:

receiving a manual indication of said first absence of movement and said second absence of movement; and automatically detecting said first absence of movement and said second absence of movement.

35. The dead band steering control system of claim 26 wherein said determiner is further for:

selling a first flag indicating that said second dead band value has been determined in response to initiating said free play set procedure; and selling a second flag indicating that said first dead band value has been determined.

36. The dead band steering control system of claim 26 further comprising:

an output for conveying said dead band first dead band value and said second dead band value to a control system for controlling said mobile machine.

* * * * *